Jan. 15, 1963  AKIO KIKUCHI  3,073,103
SIZE-ADJUSTABLE RAKE
Filed March 22, 1962
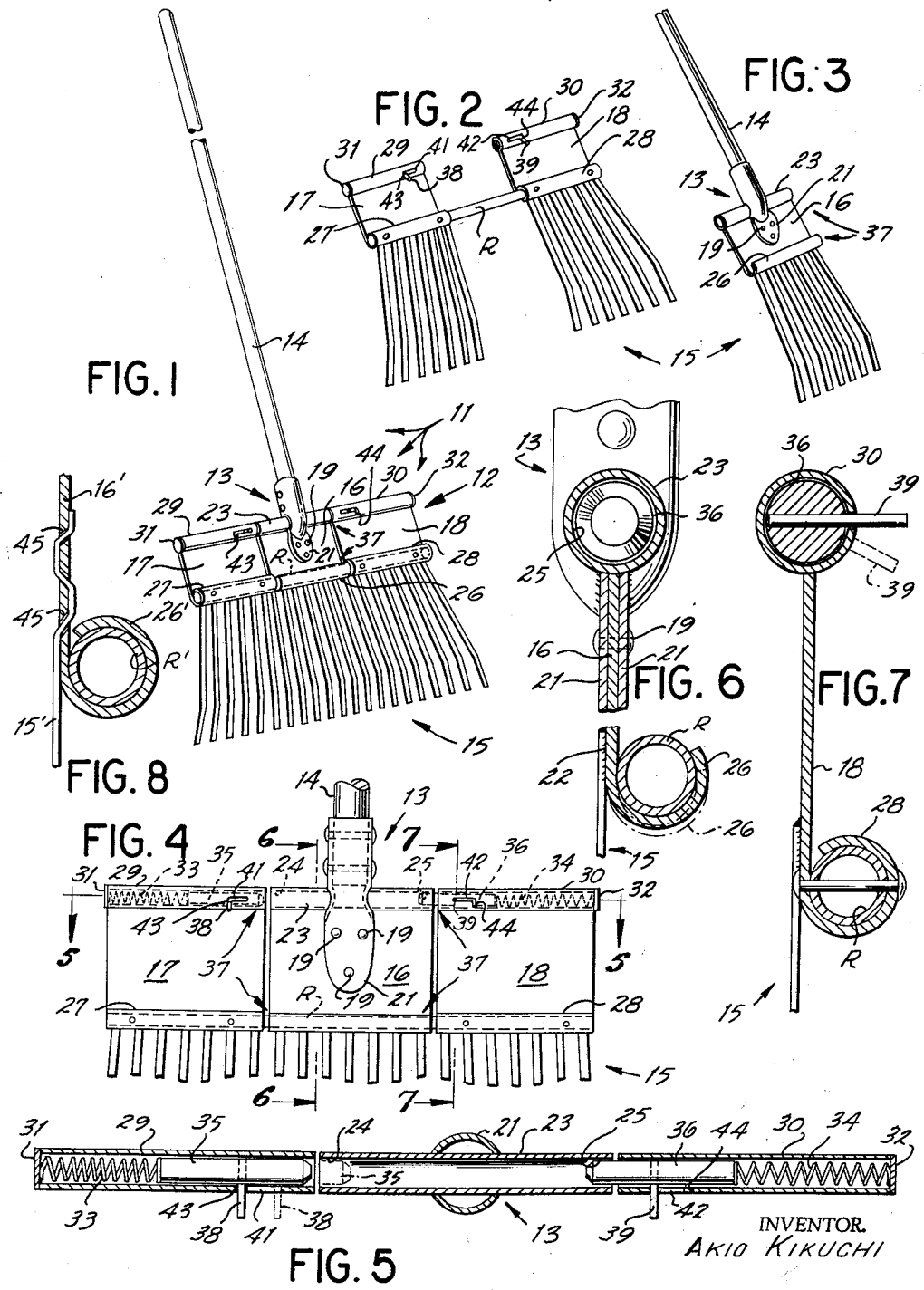
INVENTOR.
AKIO KIKUCHI United States Patent Office 3,073,103
Patented Jan. 15, 1963

3,073,103
SIZE-ADJUSTABLE RAKE
Akio Kikuchi, 1110C W. 158th St., Gardena, Calif.
Filed Mar. 22, 1962, Ser. No. 181,600
4 Claims. (Cl. 56—400.18)

Generally speaking, the present invention relates to a size-adjustable rake and, more particularly, pertains to such a size-adjustable rake which is of a type which can be adjusted as to its effective over-all width and as to the number of resilient rake fingers carried by the rake.

This makes it possible for a gardener to use the rake in its maximum size adjustment, and with a minimum number of rake fingers, during normal raking use such as raking up leaves and the like from lawns or other similar surface areas.

However, when the gardener wishes to rake areas having limited access thereto, such as between flowers or the like in a flower bed, or other equivalent limited-access areas where the conventional fairly broad garden leaf rake would be likely to cause injury to the flowers, the novel and highly advantageous size-adjustable rake of the present invention can be quickly and easily adjusted to its minimum size adjustment including a minimum number of the resilient rake fingers so as to be highly suitable for use in such relatively confined and limited-access regions—and in a manner greatly minimizing the likelihood of the smaller size rake doing any damage to the flowers or other growing plants adjacent to the limited-access region.

It is an object of the present invention to provide a novel size-adjustable rake of the character referred to above which includes a controllably size-adjustable rake head means provided with handle attachment means and also provided with a plurality of spaced, projecting resilient rake fingers which are also controllably adjustable as to number.

It is a further object of the present invention to provide a novel size-adjustable rake of the character referred to above, which is of extremely simple, inexpensive foolproof, easy-to-size-adjust, construction such as to be conducive to widespread use thereof.

Further objects are implicit in the detailed description which follows hereinafter (which is to be construed as exemplary only rather than as specifically limiting the invention to the exemplary form) and will be apparent to persons skilled in the art after a careful study of said description.

For the purpose of clarifying the nature of the present invention, one exemplary embodiment, and a slight modification of rake-finger attachment structure, are illustrated in the hereinbelow-described figures of the accompanying single drawing sheet, and are described in detail hereinbelow.

FIG. 1 is a greatly reduced-size perspective view of one exemplary embodiment of the invention in its maximum size-adjusted relationship. It should be noted that this view has a portion of the handle broken away for drawing space conservation reasons.

FIG. 2 is a perspective view of an aspect similar to FIG. 1, but illustrates only the two joined side panel portions which have been unfastened and separated from the central panel portion of FIG. 1 so as to leave the rake in its minimum size-adjusted form, as shown fragmentarily in FIG. 3.

FIG. 3 illustrates in fragmentary form (with the handle partly broken away) the rake in its minimum size-adjusted form with the joined side panel portions of FIG. 2 unfastened and removed therefrom. In other words, this view is complementary to FIG. 2.

FIG. 4 is a larger-scale, fragmentary, top plan view of the controllably size-adjustable rake head means of FIG. 1 and illustrates the left fastening means, for fastening the left side panel portion to the central panel portion, in unlocked or unfastened relationship relative to the central panel portion, while the right fastening means is shown in locked relationship for firmly fastening the right side panel portion to the central panel portion. This is done for illustrative purposes only—it being understood that normally either both of said fastening means would be unfastened to allow complete removal of the joined side panel portion as shown in FIG. 2, or they would both be in fastened relationship in the solidly locked manner clearly shown in FIG. 1. It should also be noted that in this view the resilient rake fingers and also the rake handle are broken away for drawing space conservation reasons.

FIG. 5 is a larger-scale view, partly in elevation and partly in section, taken in the direction of the arrows 5—5 of FIG. 4, and with the resilient rake fingers lying behind the plane of the view removed for drawing simplification reasons.

FIG. 6 is an enlarged fragmentary view, partly in section and partly in side elevation, taken in the direction of the arrows 6—6 of FIG. 4, and has the entire central portion of the rake head means broken away and removed for space conservation reasons.

FIG. 7 is an enlarged fragmentary view taken in the direction of the arrows 7—7 of FIG. 4, and clearly illustrates the operation of the right retaining means for controlling the position of the right fastening plunger means—it being understood that the left one is identical, although oppositely directed.

FIG. 8 illustrates a slight modification of the means for attaching the resilient rake fingers to the central panel portion.

Referring to FIGS. 1–7 for exemplary purposes, one illustrative embodiment of the invention is shown in a typical exemplary form wherein it comprises the size-adjustable rake, indicated generally at 11, which includes a controllably size-adjustable rake head means, indicated generally at 12, which is effectively provided with handle attachment or engagement means, indicated generally at 13, for attachment with respect to a handle means, such as that illustrated at 14.

In the specific example illustrated, the handle attachment or engagement means 13 takes the form of a socket adapted to receive in a rigid manner the lower end of the handle means 14. However, the invention is not specifically so limited, and said handle attachment or engagement means 13 may take various other functionally equivalent forms.

Also, the controllably size-adjustable rake head means 12 is provided with a plurality of spaced, projecting resilient rake fingers, indicated generally at 15, which are also controllably adjustable as to number.

In the form illustrated, the size-adjustable rake head means 12 comprises a central panel 16 and two side panel portions 17 and 18, which can be controllably fully fastened together in the assembled relationship shown in FIG. 1 to comprise a maximum size-adjusted form of the rake 11 or which can be disassembled by removing the joined side panel portions 17 and 18 from the central panel portion 16 in the manner illustrated in FIGS. 2 and 3, whereby to leave the rake 11 in its minimum size-adjusted relationship, as clearly shown in FIG. 3. The structural and functional detail for effecting this size adjustment will be described hereinbelow.

In the exemplary form illustrated, the central panel portion 16 is the one which carries the handle attachment or engagement means 13 and, in the exemplary structure illustrated, this is accomplished by way of fastening rivets 18 (or other equivalent mechanical fastener means); said rivets 19 extending through opposed bracket plate members 21 and the upper portion of the central panel member 16, which is positioned between the bracket plate members 21, thus providing a firm rigid attachment of the handle attachment or engagement means 13 to the central panel portion 16 in the manner best shown in FIG. 6.

Also, as is clearly shown in FIG. 6, the exemplary form of the invention has the plurality of resilient rake fingers 15 fastened thereto by suitable welded junction means, indicated at 22, connecting the upper ends of each of said fingers to the central panel portion 16.

Also, the central panel portion 16 is provided at the top with an enlarged tubular portion 23 which defines at each end thereof what may be termed plunger-receiving recess means 24 and 25, the purpose of which will be described in greater detail hereinafter.

Also, the bottom edge of the central panel portion 16 is provided with an upwardly curved resilient snap-over lip 26, the purpose of which will be described in greater detail hereinafter.

The two side panel portions 17 and 18 are provided with rolled bottom edge portions 27 and 28 which are fastened to a transverse rod member (which may be solid or of tubular construction) R, whereby to effectively and rigidly join the two side panel members 17 and 18 together. This is best shown in FIG. 2.

Each of said side panel members 17 and 18 is provided with a tubular portion 29 and 30, respectively, at the top edge thereof, which is effectively capped at the outer end thereof, as indicated at 31 and 32, respectively, and which carries therein corresponding biasing spring means 33 and 34, positioned behind the corresponding plunger means 35 and 36, respectively, whereby to normally tend to bias said plunger means inwardly or toward the open space between the two tubular top portions 29 and 30 of the two side panel portions 17 and 18, respectively.

Said plunger means 35 and 36 and the corresponding biasing springs 33 and 34, and also the opposed plunger-receiving recess means 24 and 25 of the tubular portion 23 at the top of the central panel portion 16, may be said to effectively comprise fastening means for controllably fastening the joined side panel portions 17 and 18 in rigid relationship with respect to the central panel portion 16 in the manner clearly shown in FIG. 1—and yet in a readily releasable manner to allow effective size-minimization of the rake in accordance with the sequence of steps shown in FIGS. 2 and 3.

Also, the resilient snap-over lip 26, carried at the bottom of the central panel portion, and fasteningly cooperable with the transverse rod R of the joined side panels 17 and 18, may be said to comprise a portion of said fastening means. Therefore, said fastening means is indicated generally by the reference numeral 37 which is directed to both of said structural features just described and identified in some detail.

Each of the plungers 35 and 36 is provided with a retaining and operating pin, such as indicated at 38 and 39, respectively, and which extends outwardly through corresponding slot means 41 and 42 of the tubular portions 29 and 30 at the tops of the two side panel portions 17 and 18, respectively.

It should be noted that each of said slots 41 and 42 has an offset retaining portion as indicated at 43 and 44, respectively, adapted to retain the corresponding retaining and operating pin (38 or 39) when moved thereinto in the manner clearly shown with respect to each of said pins 38 and 39 in FIG. 2 and in the manner shown with respect to the left pin 38 only, in FIG. 4— the right pin 39 in FIG. 4 being in the main portion of the slot 42 to allow the biasing spring 34 to force the plunger means 36 into the plunger-receiving recess means 25 carried by the top tubular portion 23 of the central panel portion 16.

It will readily be understood that when the left retaining and operating pin 38 is moved into a similar position, the left plunger means 35 will similarly extend into the left plunger-receiving recess means 24 and will firmly lock the entire assembly of the two side panel portions 17 and 18 and the central panel portion 16 in the side-by-side relationship shown in FIG. 1 so that the rake will effectively be in its maximum size-adjusted relationship. This is also facilitated by the slip-over engagement of the slip-over lip means 26 of the central panel portion 16 with respect to the transverse rod R of the joined side panel portions 17 and 18. The rake fingers carried by the side panel portions 17 and 18 are attached thereto in a manner similar to the attachment of the spring fingers carried by the central panel portion 16, as shown in FIG. 6, although this may be modified substantially within the scope of the present invention as desired.

It will readily be understood that the completely joined assembly shown in FIG. 1 can be quickly adjusted into the minimum size-adjusted relationship shown in FIG. 3 by merely manually grasping each of the retaining and operating pins 38 and 39, moving them outwardly along the main portions of the slots 41 and 42, and then moving them downwardly into the offset slot retaining portions 43 and 44 in the locations clearly shown in FIG. 2. Then all that is necesary to do, is to slidably move the joined side panels 17 and 18 upwardly relative to the central panel portion 16 so as to resiliently disengage the transverse rod R from the resilient snap-over lip 26 at the bottom of the central panel portion 16. Then the reduced-size rake clearly shown in FIG. 3 can be used in limited-access regions where the maximum size rake shown in FIG. 1 would be virtually unusable or would tend to injure surrounding plants or the like.

FIG. 8 illustrates a slight modification of the means for attaching the resilient rake fingers to the central panel portion. Therefore, portions of this view similar to those shown in FIG. 6 are indicated by similar reference numerals, primed, however.

It will be understood that, in this modification, the upper end of each of the resilient rake fingers 15' is laced or threaded through multiple apertures 45 in the central panel portion 16' in a zigzag manner, whereby to provide a firm mechanical connection. However, various other modes of attachment are within the scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A size-adjustable rake comprising: a controllably size-adjustable rake head means provided with a plurality of spaced projecting resilient rake fingers, controllably adjustable as to number, said size-adjustable rake head means comprising a central panel portion adapted to be provided with handle means and a pair of laterally spaced side panel portions controllably fastenable with respect to, and on each side of, said central panel portion, said rake head means being effectively provided with fastening means for fastening said side panel portions rigidly relative to said central panel portion and on each side thereof in a controllably releasable manner, said fastening means comprising two pairs of cooperating elements, with each pair of cooperating elements including a first element comprising slidable extendable plunger means and a second element comprising corresponding plunger-receiving recess means, adjacent portions of inner edges of each of said side panel portions and corresponding outer edges of said central panel portion being provided in aligned opposition with different ones of the two elements of each pair of cooperating elements comprising said fastening means whereby each plunger-receiving recess means carried by one of said edges in opposition to the corresponding slidable extendable plunger means carried by the adjacent one of said edges will be positioned for reception of said plunger means therein when said plunger means is in extended locked position, said plunger means being provided with biasing spring means normally biasing them toward the extended locked positions thereof and further being provided with controllably operable retaining means for controllably retaining said plunger means in retracted unlocked relationship, said retaining means for each of said plunger means comprising slot means carried by the corresponding panel portion and having an offset retaining portion, and further comprising through-projecting pin means effectively connected with respect to the corresponding plunger means and cooperable with said slot means whereby to control the position of said plunger means.

2. A size-adjustable rake comprising: a controllably size-adjustable rake head means provided with a plurality of spaced projecting resilient rake fingers, controllably adjustable as to number, said size-adjustable rake head means comprising a central panel portion adapted to be provided with handle means and a pair of laterally spaced side panel portions controllably fastenable with respect to, and on each side of, said central panel portion, said rake head means being effectively provided with fastening means for fastening said side panel portions rigidly relative to said central panel portion and on each side thereof in a controllably releasable manner, said fastening means comprising two pairs of cooperating elements, with each pair of cooperating elements including a first element comprising slidable extendable plunger means and a second element comprising corresponding plunger-receiving recess means, adjacent portions of inner edges of each of said side panel portions and corresponding outer edges of said central panel portion being provided in aligned opposition with different ones of the two elements of each pair of cooperating elements comprising said fastening means whereby each plunger-receiving recess means carried by one of said edges in opposition to the corresponding slidable extendable plunger means carried by the adjacent one of said edges will be positioned for reception of said plunger means therein when said plunger means is in extended locked position, said plunger means being provided with biasing spring means normally biasing them toward the extended locked positions thereof and further being provided with controllably operable retaining means for controllably retaining said plunger means in retracted unlocked relationship, said retaining means for each of said plunger means comprising slot means carried by the corresponding panel portion and having an offset retaining portion, and further comprising through-projecting pin means effectively connected with respect to the corresponding plunger means and cooperable with said slot means whereby to control the position of said plunger means, said fastening means also including resilient snap over lip means carried by said central panel portion and a corresponding member connected between said side panel portions and resiliently engageable within said resilient snap over lip means of said central panel portion for fastening all three panel portions together in side-by-side relationship.

3. A size-adjustable rake comprising: a controllably size-adjustable rake head means provided with handle attachment means and a plurality of spaced projecting resilient rake fingers, controllably adjustable as to number, said size-adjustable rake head means comprising a central panel portion provided with said handle attachment means fixedly attached to the center thereof and extending away therefrom and a pair of laterally spaced side panel portions controllably fastenable with respect to, and on each side of, said central panel portion, said central panel portion and said side panel portions being effectively provided with fastening means for fastening said side panel portions rigidly relative to said central panel portion and on each side thereof in a controllably releasable manner, said fastening means comprising recess means carried adjacent inner edges of each of said side panel portions and provided therein with slidable plunger means, and also including corresponding plunger-receiving recess means carried by outer edges of said central panel portion for reception of said plunger means therein in locking relationship when said plunger means are extended into locked positions, each of said plunger means being provided with biasing spring means normally biasing said plunger means in a direction toward the extended locked position thereof and further being provided with controllably operable retaining means for controllably retaining said plunger means in retracted unlocked relationship, said retaining means for each of said plunger means comprising slot means carried by the corresponding panel portion and having an offset retaining portion, and further comprising through-projecting pin means effectively connected with respect to the corresponding plunger means and cooperable with said slot means whereby to control the position of said plunger means.

4. A size-adjustable rake comprising: a controllably size-adjustable rake head means provided with handle attachment means and a plurality of spaced projecting resilient rake fingers, controllably adjustable as to number, said size-adjustable rake head means comprising a central panel portion provided with said handle attachment means fixedly attached to the center thereof and extending away therefrom and a pair of laterally spaced side panel portions controllably fastenable with respect to, and on each side of, said central panel portion, said central panel portion and said side panel portions being effectively provided with fastening means for fastening said side panel portions rigidly relative to said central panel portion and on each side thereof in a controllably releasable manner, said fastening means comprising recess means carried adjacent inner edges of each of said side panel portions and provided therein with slidable plunger means, and also including corresponding plunger-receiving recess means carried by outer edges of said central panel portion for reception of said plunger means therein in locking relationship when said plunger means are extended into locked positions, each of said plunger means being provided with biasing spring means normally biasing said plunger means in a direction toward the extended locked position thereof and further being provided with controllably operable retaining means for controllably retaining said plunger means in retracted unlocked relationship, said retaining means for each of said plunger means comprising slot means carried by the corresponding panel portion and having an offset retaining portion, and further comprising through-projecting pin means effectively connected with respect to the corresponding plunger means and cooperable with said slot means whereby to control the position of said plunger means, said fastening means also including a resilient snap over lip carried at the bottom of said central panel portion and a corresponding transverse member connected between bottom parts of the inner edges of said side panel portions and resiliently engageable within said resilient snap over lip portion of said central panel portion for fastening all three panel portions together in side-by-side relationship when desired.

References Cited in the file of this patent

UNITED STATES PATENTS

| | | |
|---|---|---|
| 2,008,073 | Huntley | July 16, 1935 |
| 2,790,296 | Bernstein | Apr. 30, 1957 |
| 2,855,746 | Miller | Oct. 14, 1958 |